US006129814A

United States Patent [19]

Ballestrazzi et al.

[11] Patent Number: 6,129,814

[45] Date of Patent: Oct. 10, 2000

[54] DEVICE FOR ROTATING A LABEL FED INTO A LABELLING MACHINE

[75] Inventors: Aris Ballestrazzi; Lamberto Tassi, both of Modena, Italy

[73] Assignee: Sitma S.p.A., Spilamberto, Italy

[21] Appl. No.: 09/130,109

[22] Filed: Aug. 6, 1998

[30] Foreign Application Priority Data

Aug. 20, 1997 [IT] Italy ................................ MI97A1950

[51] Int. Cl.[7] ............................. B32B 31/00; B65C 9/00

[52] U.S. Cl. .......................... 156/556; 156/566; 156/569; 156/DIG. 37

[58] Field of Search .................................... 156/566, 556, 156/542, 571, DIG. 78, DIG. 30, DIG. 31, DIG. 37, 569

[56] References Cited

U.S. PATENT DOCUMENTS

| | | | |
|---|---|---|---|
| 4,032,388 | 6/1977 | Dunning . | |
| 4,293,365 | 10/1981 | Geyser et al. | 156/364 |
| 4,787,953 | 11/1988 | Trouteaud et al. . | |
| 5,221,405 | 6/1993 | Trouteaud | 156/364 |

FOREIGN PATENT DOCUMENTS

| | | |
|---|---|---|
| 0 773 165 | 5/1997 | European Pat. Off. . |
| 2 005 220 | 4/1979 | United Kingdom . |
| WO 96/39331 | 12/1996 | WIPO . |

*Primary Examiner*—Richard Crispino
*Assistant Examiner*—Sue A. Purvis
*Attorney, Agent, or Firm*—Oblon, Spivak, McClelland, Maier & Neustadt, P.C.

[57] ABSTRACT

Device for rotating a label fed into a labelling machine, wherein the label is fed to a support element placed on a wheel which rotates between a position where the label is picked up from a conveyor or feed belt and a position where the label is placed on a product, the support element having at least a label holding element during the rotation of the wheel in a fixed structure, wherein the label holding element is positioned on a shaft which can be rotated by means control elements driven by a cam group operationally connected to the wheel and to the fixed structure. In particular, the holding element is a suction device which allows the rotation of the label as required.

9 Claims, 4 Drawing Sheets

29
32
30
23
28
39
31
37
42
41
43
38
33
20

DEVICE FOR ROTATING A LABEL FED INTO A LABELLING MACHINE

BACKGROUND OF THE INVENTION

Field of the Invention

The present invention refers to a device for rotating a label fed into a labelling machine.

It is well known to those skilled in the art that the position of a label on a product has to be in compliance with the postal regulations in force in various countries and that the various countries have different postal regulations.

Therefore, it is not always easy to meet the required positioning because of the difficulties in handling the label.

In fact, labelling machines which pick up each single label one by one and then put said labels on the product to be packaged or on the product which only needs the address are known.

In particular, the working phases of a known labelling machine can be summarized as follows.

The labels are placed on a continuous sheet, as for instance a printout provided with opposed perforated lateral edges suitable to drive the printout, which initially is folded several times one sheet over the other or in a zigzag pattern.

A series of printed portions are present on the printout and said printed portions will constitute the various labels.

A drive system is provided with wheels having pins which engage with the printout lateral edges, which are provided with holes and therefore the printout advances on a horizontal plane, such that the printings on the various label portions face downwardly.

The printout is cut and divided by longitudinal and transverse cutters to obtain rows formed by a certain number of labels.

The label rows are picked up by a perforated conveyor belt, with a suction device, which carries said labels to a wheel which picks up and then releases the labels on the product where said labels have to be positioned.

The labels are then picked up, one by one, from the wheel and said labels are put in contact with a glue buffer. Then said labels are released on the product which passes through the plane of the packing machine or of the address labelling machine.

In this manner the labels are positioned perpendicularly to the head title, i.e. they are not in compliance with some specific postal regulations which require a mutually parallel positioning between the head title and the address.

In order to overcome this disadvantage, the label has to be rotated by a 90° angle before putting said label on the product.

Until today it has been very difficult to comply with said rules; in fact, based upon technical reasons, such as inserts being fed within the base product, the need for ease in packaging products advancing longitudinally to the drive direction, and other problems had two types of solutions. A first solution was to ask for an exception from the postal regulations and a second solution was to label the packaged product after having rotated said product by a 90° angle, by means of a specific rotation apparatus associated with the labelling machine (this solution, as mentioned before, strongly jeopardizes the efficiency of the labelling machine or of the capacity to apply the address labels and causes additional costs to be incurred due to the presence of a second apparatus).

SUMMARY OF THE INVENTION

The main purpose of the present invention is to solve the above mentioned technical problems.

A further purpose is to manufacture a labelling machine which allows different positionings of the label, in response to the needs of the local postal service, without having a particularly complex device, which is difficult to use, expensive or needs frequent adjustments. According to the present invention, these purposes are achieved by manufacturing a device for rotating a label fed into a labelling machine, wherein said label is fed to a support element placed on a heel, which rotates between a position where the label is picked up from a conveyor or feed belt and a position where the label is placed on a product, said support element being associated with at least a label holding element during the rotation of the wheel in a fixed structure, characterized in that said label holding element is positioned on a shaft which can be rotated by means of control elements driven by a cam group operationally connected to said wheel and to said fixed structure. Advantageously, said holding element is a suction mechanism.

BRIEF DESCRIPTION OF THE DRAWINGS

The features and advantages for a rotation device of a label fed into a labelling machine according to the present invention will be better understood from the following description of a nonlimiting example, said description referring to the accompanying schematic drawings, in which.

DESCRIPTION OF THE PREFERRED EMBODIMENTS

Figure 1:
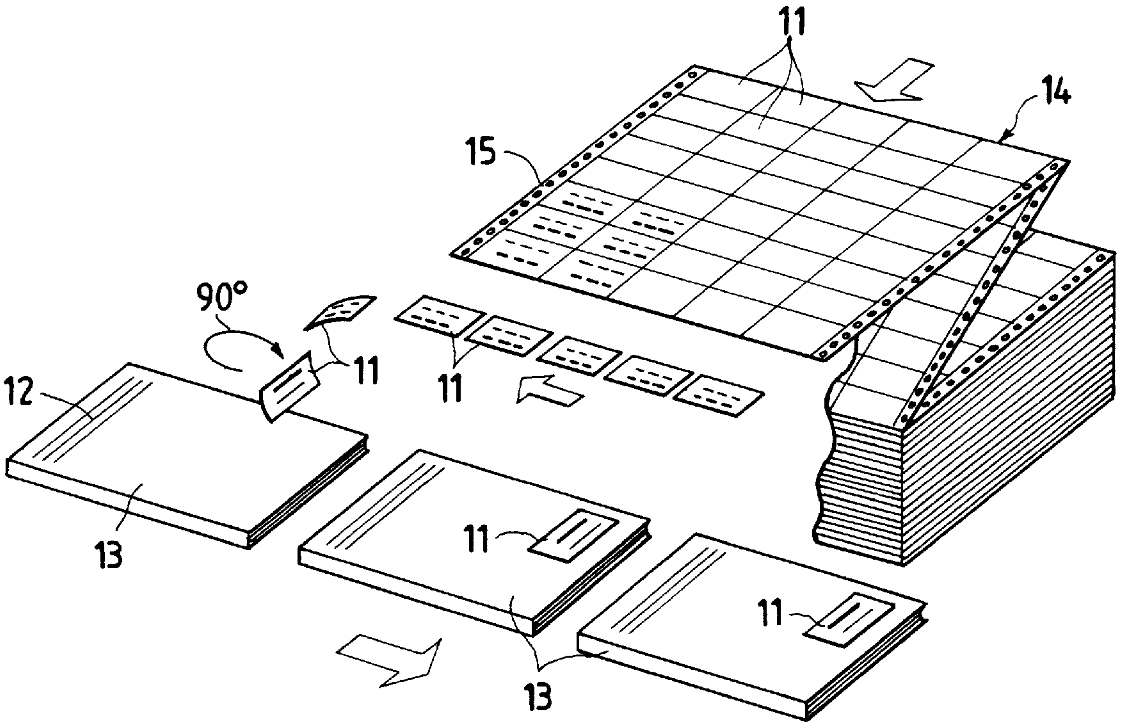
FIG. 1 is a perspective view which shows how the labels are fed in such a way that they are parallel to the head title of the product.

Referring to FIG. 1 of the drawings, it is schematically shown how the labels 11 are fed in such a manner that they are parallel to the head title 12 of a product 13, which for instance passes through a packaging machine or a label positioning machine, not shown.

In the example, the labels 11 are placed on a continuous sheet 14, as for instance a printout provided with opposed perforated lateral edges 15 suitable to drive the printout, which initially is folded several times one sheet over the other or in a zigzag pattern. As known, the labels 11 are formed by a series of printed portions on the continuous sheet 14.

Figure 2:
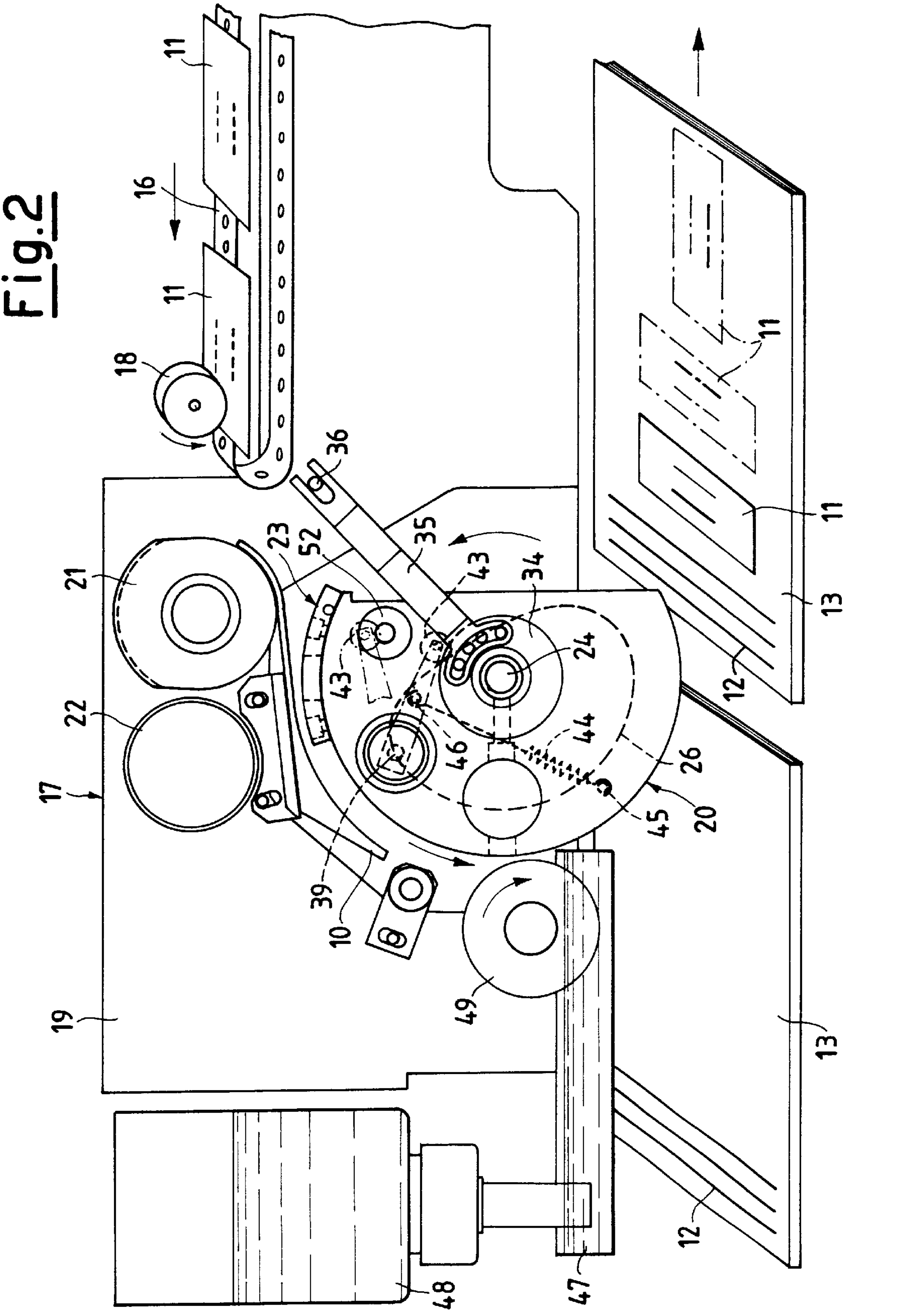
FIG. 2 shows an elevational view, with some details in perspective view, of a rotation device according to the present invention for a series of labels which are fed, one after another, into the labelling machine.
Figure 3:
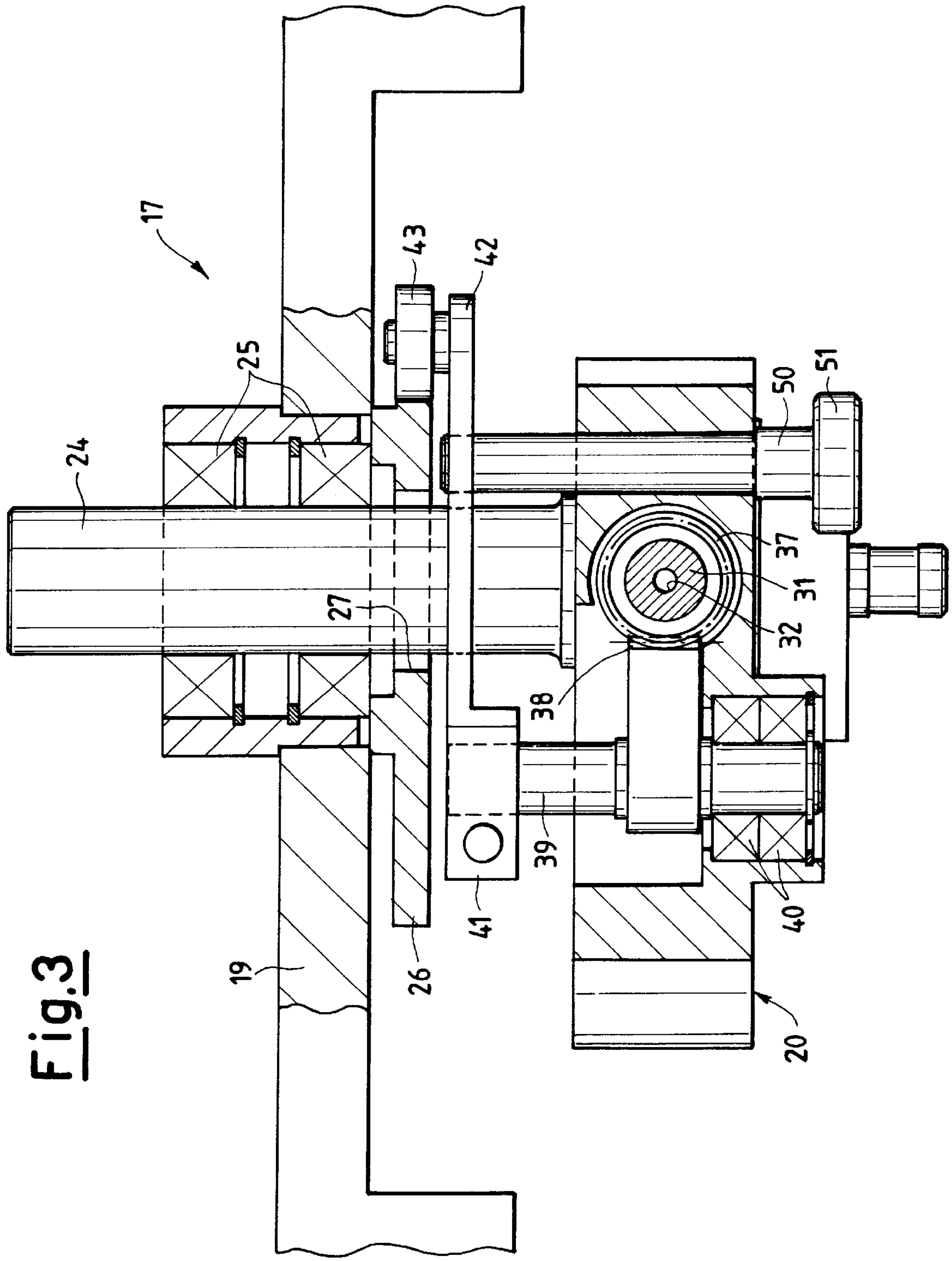
FIG. 3 shows an enlarged top cross sectional view of a portion of the labelling machine carrying the device of the present invention, showing some of the portions thereof.
Figure 4:
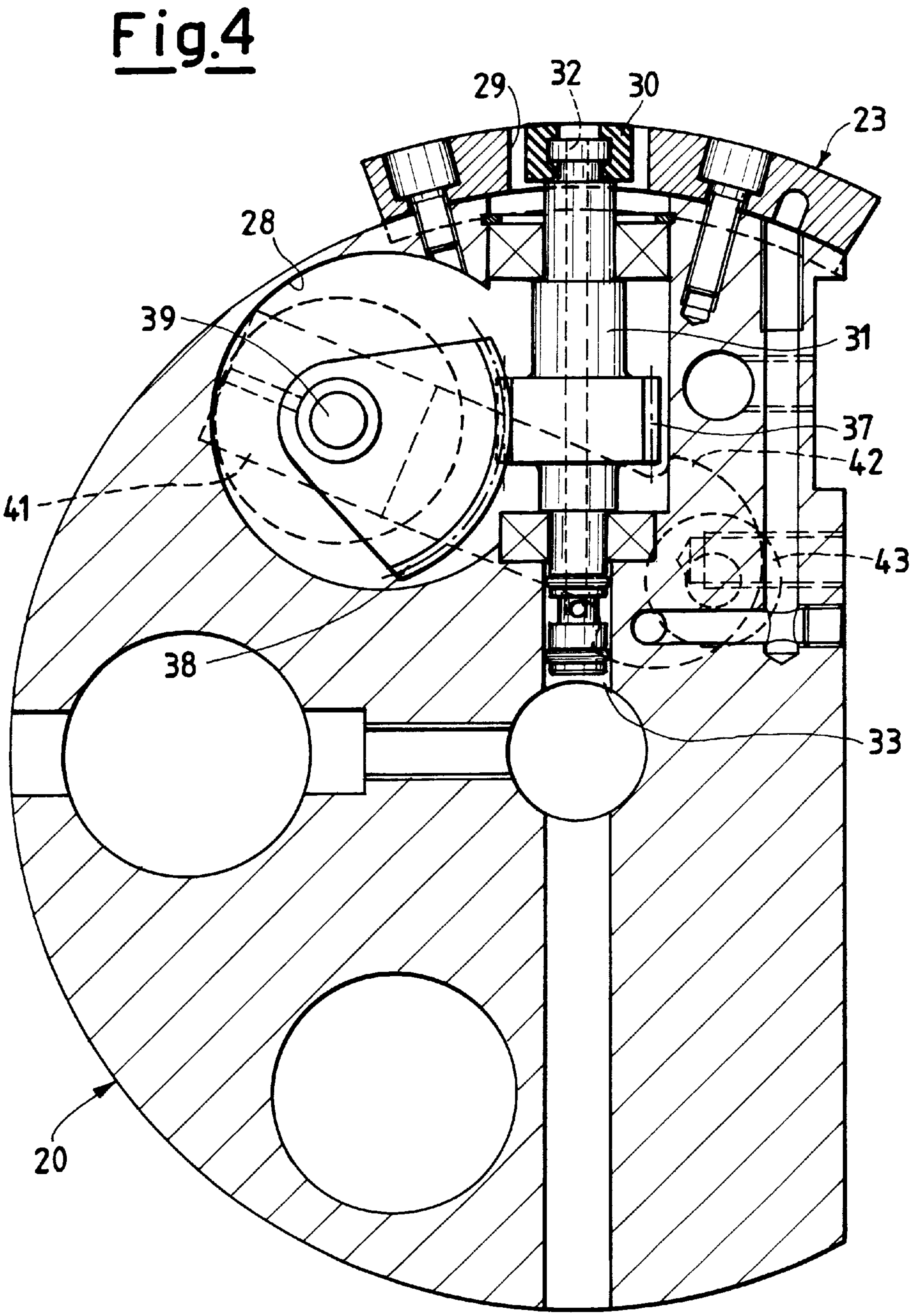
FIG. 4 shows an enlarged front cross section of the device portion shown in FIG. 3.

As shown in FIG. 2, a conveyor or feed belt 16, of the sucker type and provided with holes, is provided, said belt receiving the single labels 11 which have been separated by the cutting system, not shown, and carries said labels towards a labelling machine, indicated by numeral 17 for the shown portion.

A rubber roll 18 is placed above the feed or conveyor belt 16, in its final portion, said roll, besides feeding the labels 11 one after another towards the labelling machine, also allowing holding of the label which follows the one fed into the labelling machine, therefore assuring detachment of said label in case said detachment was not previously achieved. The labelling machine 17 substantially comprises a structure 19 on which a wheel 20 is positioned. Said wheel being capable of receiving the single label 11 which comes from the feed or conveyor belt 16 and of positioning said label on the product 13 in the proper positioning. In particular, it is noted that a rotating buffer 21 faces the final end of the conveyor or feed belt 16, said buffer receiving the label 11. Said buffer 21, rotatably driven by a gear 22, carries the label 11 and positions it, using a cooperating guide 10, on a support element 23 ("pad") integral with the above mentioned wheel 20.

According to the present invention, the device for rotating a label 11 to be fed is provided within the wheel 20 and the support element 23.

In fact, it should be noted that, first of all, the wheel 20 is caused to rotate by a shaft 24, which is supported by the bearings 25 on the structure 19 of the labelling machine. A cam 26 is integral with the structure 19, the shaft 24 passing through a central hole 27 of said cam. The support element 23 is placed on the side cylindrical portion of the wheel 20 and is positioned at the outward facing portion of a large shaped housing 28 which contains the driving unit of the device according to the present invention.

The support element 23 comprises a plate, fixed to the wheel 20, provided with an opening 29 wherein a sucker element 30 can be placed. This sucker element 30 is placed at the end of a shaped shaft 31, provided with a central hole 32, said shaft can be connected at its other end to an air suction channel 33. At this lower end, the shaft 31 is provided with specific O rings to receive the sucked air without any leaks.

Further, a fixed valve 34 is placed by said channel 33 obtained in the wheel 20, said valve distributing, according to a certain timing, the air sucked in by the sucker element 30. The sucker element 30 is the holding element of the label 11 as the wheel 30 rotates. For instance, the fixed valve 34 is supported by an arm 35 which can be fixed in an adjustable way to the structure 19, through a specific adjustment device schematically shown by 36.

Further, the shaped shaft 31 has a first gear 37, for instance of the helicoidal type, which engages with a gear sector 38, helicoidally shaped as well, pivoted to the body of the wheel 20 by a shaft 39. The shaft 39, supported by bearings 40, carries, at one of its ends extending outside the wheel 20 on the wheel surface which faces the cam 26, the end 41, fixed as well, of a lever 42. The lever 42 can therefore oscillate and has, at the other free end, an idle wheel 43 suitable to stay engaged with the outer surface of the cam 26. Said engagement is guaranteed by the presence of a spring 44 fixed to said wheel at one end in 45 and to an intermediate area of the lever 42 at the other end in 46.

Further, the structure 19 has a tank 47 which contains glue, which is fed from a replaceable container 48. A buffer wheel 49, partially immersed in the tank, picks up and applies the glue to the rear portion of the label 11. The glue application is performed since the label 11, held on the support element 23, is put in contact with the buffer wheel 49 so as to receive the glue.

Further, an additional shaft 50 is positioned on the wheel 20, said shaft being provided with a control knob 51 at one end and can be moved along an axis parallel to the one of the shaft 24 which carries the wheel. This additional shaft 50 is the blocking element of the oscillation of the lever 42, when it is pushed towards the cam 26 and it is brought below the lever 42 so as to steadily block said lever in the maximum lifting position.

Then, the device according to the present invention allows a label, which is fed to a support element 23 positioned on a wheel 20, to be rotated. This is advantageously achieved, without any additional apparatus, when the wheel 20 is rotated between a first pick up position of the label 11 by means of a suction conveyor or feed belt 16 and a second position where the label 11 is placed on a product 13.

This operation is performed because the sucker 30 or the holding element of the label 11 is positioned on the shaft 31 which can be rotated by the control elements, previously indicated by 37, 38, 39, which can be driven by means of a cam group, indicated by 26 (cam), 43, 42 (lever and bearing), which is operationally connected to the wheel 20 and to the fixed structure 19.

When the device according to the present invention is applied to a labelling machine, said device works as follows.

Each single label 11, once cut by the cutter means from the continuous sheet 14, is then carried towards the wheel 20 of the labelling machine 17 supported by the suction conveyor or feed belt 16 and then said label is positioned on the rotating buffer 21.

During the pick up phase of the label 11, the rubber roll 18 holds the following label on the suction belt 16 so as to guarantee the separation of the labels 11 cut only in part.

Then, the rotating buffer 21, in cooperation with the 25 guide 10, carries the label 11 to the support element or pad 23. In particular, the label 11 starts advancing again as soon as it leaves the buffer 21 and as it is sent by the guide 10 to the support element 23 where it is held thanks to the suction device 30, activated by the valve 34 in the air suction channel.

Since the suction device 30 is positioned on the rotating shaft 31, it performs several functions.

First of all, the suction device 30 holds the label 11 during the counter clockwise rotation of the wheel 20 carrying the support element 23 thanks to the sucked air, introduced into the central hole 32 of the shaft 31 and in the specific channels and adjusted by the specific valve 34.

Further, the suction device 30 rotates the label 11 by a 90° angle (to the left or to the right, according to the type of the helicoidal orthogonal gears 37, 38 which have been mounted) simultaneously to the counter clockwise rotation of the wheel 20 carrying the support element 23.

Further, the suction device 30 still holds the label 11 during the glue spreading phase on the rear portion of the label. Said operation, as shown, is performed by the buffer wheel 49 (FIG. 2) which absorbs glue from the tank 47 below and then spreads, through contact, said glue on the rear surface of the label 11.

Finally, the suction device 30 releases the label 11 on the product 13 passing through the machine plane as soon as the suction phase, which is disconnected and controlled by the valve 34.

The label 11 is positioned as shown in FIG. 2, i.e. with the address parallel to the head title.

The two positions shown by a dashed lines in the same figure can be provided as well.

The rotation of the gear sector 38 is caused by the wheel 43 which, when the wheel 20 rotates, follows the fixed cam 26 and causes the lever 42 to oscillate. When the gear sector 38 rotates, it causes the gear 37 to rotate together with the shaft 31 which carries the suction device 30.

As stated, it is possible to rotate the suction device 30 in one direction or in the other so as to perform a 90° rotation as required. Further, if such rotation is not needed, it is possible to exclude the rotation of the suction device 30, by driving the additional shaft 50 and by blocking the lever 42 in the fixed lifted position without any interaction with the cam 26 during rotation of the wheel 20. This will cause the labels to either perform or not perform a 90° rotation, according to the requirements and, as stated before, having mounted a right-hand or a left-hand helicoidal gear, the rotation of the label will proceed one direction rather than in the other.

Therefore, all the problems linked to rotation of the label in a labelling machine have been solved successfully by applying directly to said label a device for rotating a label fed into a labelling machine.

All in all, this is therefore achieved significant additional cost and with an assembly which is extremely simple and functional. Advantageously, it has even been manufactured a device which allows to provide various positioning of the label, according to the requirements of the local postal service, by using a simple blocking element.

Obviously, numerous modifications and variations of the present invention are possible in light of the above teachings. It is therefore to be understood that within the scope of the appended claims, the invention may be practiced otherwise than as specifically described herein.

What is claimed is:

1. Device for rotating a label fed into a labelling machine, which comprises:

a shaft;

a cam;

a plurality of control elements;

a lever which is oscillatable;

a support element positioned on a wheel wherein said label is fed to said support element, said wheel being rotatable between a position where the label is picked up from one a feed mechanism and a conveyor belt and a position where the label is placed on a product, said support element being operatively associated with at least a label holding element during the rotation of the wheel in a fixed structure, the first structure having a cam fixed thereto, said holding element of the label being positioned on said shaft and said shaft being rotatable by said control elements driven by said cam group, said cam group being operationally connected to said wheel and to said fixed structure wherein said holding element is positioned at an end portion of a shaft which is rotatable by a pair of gears, wherein one of said gears is operatively connected to said lever, said lever having one end engaged with said cam.

2. Device as claimed in claim 1, wherein said holding element comprises a suction device.

3. Device as claimed in claim 2, which comprises a valve and an air suction channel operatively associated with said suction device, said air suction channel being communicated with said valve for distributing, according to a predetermined timing, the air which has undergone suction.

4. Device as claimed in claim 1, which comprises a shaft wherein said lever is pivotally engaged at one end thereof with said shaft, said shaft being rotatable around said wheel while another end thereof has an idle roller mounted thereon.

5. Device as claimed in claim 1, wherein said pair of gears comprise a gear section which is oscillatable around said wheel and a gear integral with said shaft.

6. Device as claimed in claim 1, which comprises an elastic element operatively associated with said lever to hold said end of said lever engaged with said cam.

7. Device as claimed in claim 1, wherein that said holding element comprises a plate provided with a central opening inside which said holding element of the label is placed.

8. Device as claimed in claim 1, which comprises a blocking element wherein said shaft is disengageable from rotation by said blocking element.

9. Device as claimed in claim 1, wherein said blocking element blocks operation said lever so as to prevent said cam from cooperating with said lever.

* * * * *